May 27, 1930.  T. G. SYDNOR  1,760,024
WEED CUTTER
Filed July 23, 1929
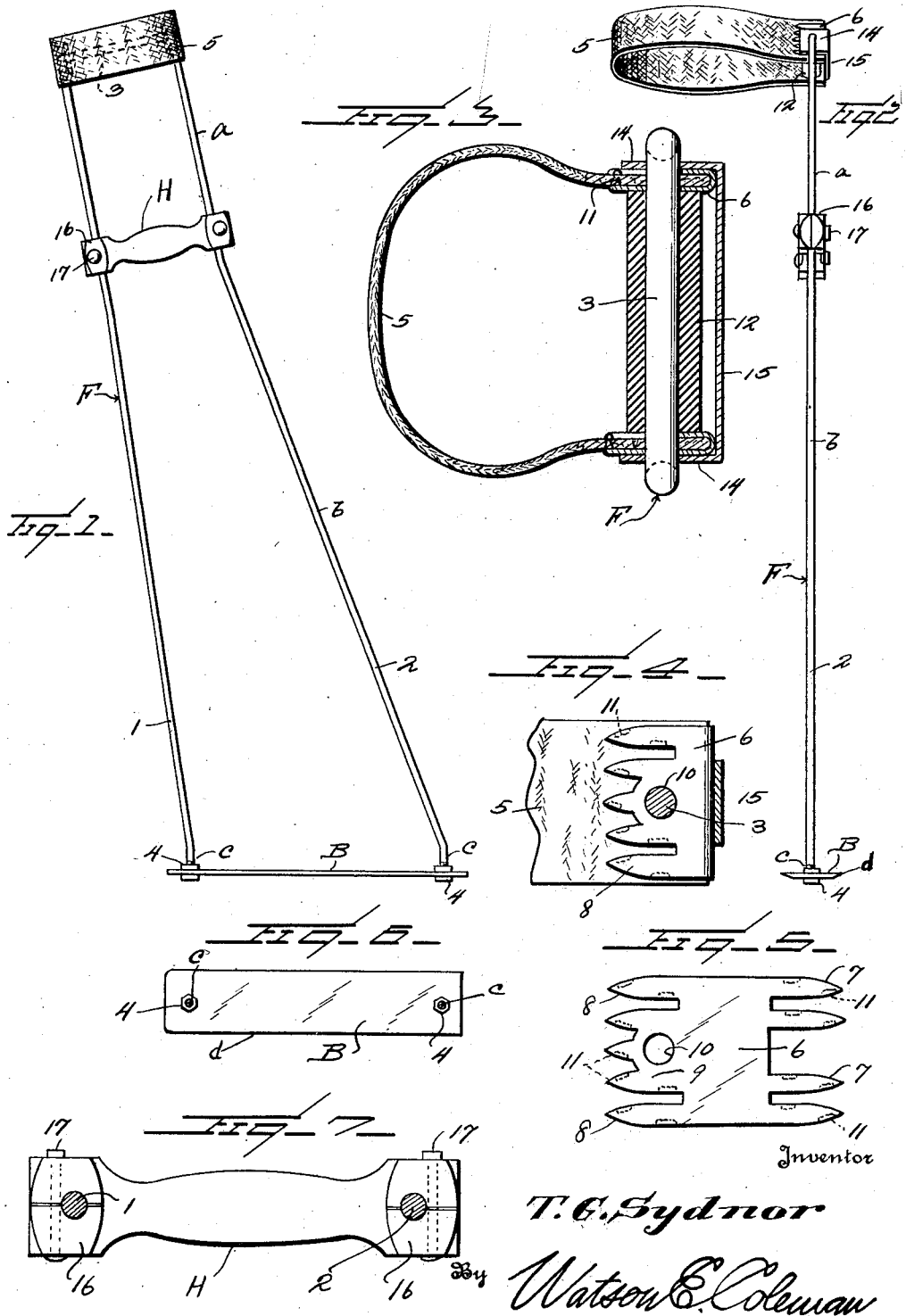
Inventor
T. G. Sydnor
By Watson E. Coleman
Attorney Patented May 27, 1930

1,760,024

UNITED STATES PATENT OFFICE

THOMAS G. SYDNOR, OF RICHMOND, VIRGINIA

WEED CUTTER

Application filed July 23, 1929. Serial No. 380,352.

This invention relates to a weed cutter and it is an object of the invention to provide a device of this kind adapted to be swung or oscillated upon the natural swing of an arm with the user maintaining substantially an erect position.

Furthermore, it is an object of the invention to provide a device of this kind adapted to be manually operated with a minimum of exertion on the part of the person.

Another object of the invention is to provide a device of this kind comprising a frame structure carrying a two edged removable blade at one extremity and provided with an arm encircling member at the opposite extremity with a hand grasp arranged at a desired distance inwardly of the encircling member.

An additional object of the invention is to provide a device of this kind wherein the arm encircling member may be readily adjusted to one side or the other of the frame in accordance with the preference of practice and wherein the blade and frame are connected together as a unit possessing sufficient flexibility to permit the blade to spring automatically.

A still further object of the invention is to provide a device of this kind wherein the hand grasp or handle is connected to the frame in a manner to permit said hand grasp or handle to be adjusted to best accommodate the height and reach of the operator.

The invention consists in the details of construction and in the combination and arrangement of the several parts of my improved weed cutter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a side elevational view of a weed cutter constructed in accordance with an embodiment of my invention;

Figure 2 is a view in edge elevation of the structure as illustrated in Figure 1;

Figure 3 is a view partly in top plan and partly in section illustrating in detail the construction and mounting of the limb encircling member as herein embodied;

Figure 4 is a fragmentary view partly in section and partly in elevation illustrating means as herein embodied for connecting an end portion of the limb encircling member to the cross member of the frame;

Figure 5 is a view in plan of a holding clip for the limb encircling member unapplied and extended;

Figure 6 is a view in top plan of the cutting blade with the associated members of the frame in section;

Figure 7 is a view partly in top plan and partly in section illustrating in detail the handle or hand grasp as herein employed.

As herein disclosed, my improved weed cutter consists of a frame F of desired length and which comprises two side rods 1 and 2 in desired spaced relation and connected at their upper extremities by the integral cross member 3. In other words, the rods 1 and 2 and the cross member 3 are in one piece. The rod 1 is substantially straight from end to end while the rod 2 has its upper portion $a$ substantially in parallelism with the adjacent portion of the rod 1. The remainder and major portion $b$ of the rod 2 is disposed outwardly and downwardly on a predetermined angle with respect to the rod 1. The lower end portions of the rods 1 and 2 are continued by the short angularly disposed and parallel extensions $c$.

The extensions $c$ of the frame F are insertible through the opposite end portions of a substantially flat elongated blade B having its longitudinal margins straight and formed into cutting edges $d$. The blade B is held to the extensions $c$ by the clamping nuts 4 threaded upon the extensions $c$ and engaging the opposite faces of the blade B. Upon removal of the under nuts 4 the blade B may be readily removed and replaced as may be required.

Coacting with the cross member 3 is an arm encircling member 5 of desired material and which has said cross member 3 disposed through the extremities thereof. The member 5 is relatively broad and may be formed of one or more plies as preferred. However, as this is of no especial importance a detailed illustration thereof is not believed necessary.

Engaged with each end portion of the member 5 is a reinforcing clip or plate 6 of metal. This plate when initially formed is flat and is provided at the opposite end portions of one longitudinal margin with the outstanding fingers 7 and along its opposite marginal portions with the outstanding fingers 8.

The central fingers 8 are of a length less than that of the end fingers providing an extension side plate 9. This extension plate 9 has therethrough an opening 10 through which the cross member 3 is directly engaged while the two different sets of fingers 7, when the clip is applied to an end portion or extremity of the member 5, are positioned at opposite sides of the cross member 3.

In practice, the plate 6 is reverted at substantially its transverse center to clamp therebetween an end portion or extremity of the member 5, said clip or plate being effectively held to the member 5 by the penetrating points 11 carried by the fingers 7 and 8, thus assuring an effective clinching of the clip to the member 5.

Surrounding the cross member 3 is an elongated tubular member 12, preferably of rubber, which serves to maintain the extremities of the member 5 in desired spaced relation and in close contact with the angular extensions 14 of the elongated plate 15. The plate 15 together with the extensions 14 are preferably of metal and the outer flat face of the plate 15 provides a space for stamping thereon the trade name for the implement or tool as well as the name of the manufacturer. The extensions 14 of the plate 15 are engaged with the cross member 3 and arranged immediately adjacent to the upper end portions of the rods 1 and 2 as is believed to be clearly illustrated in the accompanying drawing.

The engagement of the limb encircling member or arm band 5 upon the cross member 3 is such that said member or band 5 can be adjusted from one side to the other of the frame F as may be preferred for use with either the right or left arm of the operator.

A handle or hand grasp H is interposed between the parallel portions $a$ of the rods 1 and 2. The opposite end portions of this handle or hand grasp H are split to provide jaws 16 between which the portions $a$ are engaged, said jaws having clamping contact with said portions $a$ through the medium of the associated bolts and nuts, as indicated at 17. Upon loosening the clamping engagement of the jaws 16 with the portions $a$ of the rods 1 and 2, the handle or hand grasp H may be adjusted toward or from the arm encircling member 5 as the occasions of practice may necessitate in order to assure an easy and comfortable placement of the weed cutter with respect to the arm of the user.

As illustrated in Figure 1, it is to be noted that the rods 1 and 2 are of such lengths to arrange the blade B at an angle with respect to the longitudinal axis of the rod 1 so that in practice the device as oscillated or swung in front of the operator will bring the blade B substantially in parallelism with the ground surface and thereby materially increasing the efficiency of the implement.

In practice, the implement is swung or oscillated in front of the user with the rod 1 innermost and with the forearm disposed through the encircling member 5, and with the hand in easy or free engagement with the handle or hand grasp H the implement may be used with a minimum of exertion and with the operator maintaining substantially an upright position at all times. It is also to be understood that the rods 1 and 2 are preferably circular in cross section to avoid clogging.

From the foregoing description it is thought to be obvious that a weed cutter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A device of the class described comprising a frame consisting of side rods and a cross member connecting the rods to one end of the frame, a two edged blade secured to the opposite end portions of the rods, an arm encircling member swingingly carried by the cross member of the frame, said arm encircling member comprising a looped member, a tubular spacing member adapted to surround said cross member and engage at the opposite ends thereof the free ends of said looped member and reinforcing securing means engaging said free ends of said looped member and a hand grasp interposed between and secured to the side rods of the frame inwardly of the cross member.

In testimony whereof I hereunto affix my signature.

THOMAS G. SYDNOR.